United States Patent
Yi et al.

(10) Patent No.: US 10,971,944 B2
(45) Date of Patent: Apr. 6, 2021

(54) WIRELESS CHARGING APPARATUS USING ELECTROMAGNETIC INDUCTION AND WIRELESS CHARGING METHOD USING ELECTROMAGNETIC INDUCTION

(71) Applicant: SAMSUNG SDI CO., LTD., Yongin-si (KR)

(72) Inventors: Sang Il Yi, Yongin-si (KR); Seung Won Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 214 days.

(21) Appl. No.: 16/303,084

(22) PCT Filed: Mar. 20, 2017

(86) PCT No.: PCT/KR2017/002965
§ 371 (c)(1),
(2) Date: Nov. 19, 2018

(87) PCT Pub. No.: WO2017/204447
PCT Pub. Date: Nov. 30, 2017

(65) Prior Publication Data
US 2019/0305577 A1  Oct. 3, 2019

(30) Foreign Application Priority Data

May 23, 2016 (KR) .................. 10-2016-0062907

(51) Int. Cl.
*H01M 10/44* (2006.01)
*H01M 10/46* (2006.01)
(Continued)

(52) U.S. Cl.
CPC ............... *H02J 7/025* (2013.01); *G01G 1/00* (2013.01); *H02J 50/10* (2016.02); *H02J 50/40* (2016.02);
(Continued)

(58) Field of Classification Search
CPC .. H02J 50/10; H02J 50/40; H02J 50/50; H02J 50/60; H02J 7/0042; H02J 7/355;
(Continued)

(56) References Cited

U.S. PATENT DOCUMENTS 6,043,644 A * 3/2000 de Coulon ........... G01D 5/2208
324/164
6,803,744 B1 * 10/2004 Sabo .................... H02J 7/00302
320/108
(Continued)

FOREIGN PATENT DOCUMENTS

KR   10-2007-0055086 A   5/2007
KR   10-2010-0029958 A   3/2010
(Continued)

OTHER PUBLICATIONS

EPO Extended Search Report dated Oct. 14, 2019, from corresponding European Patent Application No. 17802966.6 (7 pages).

*Primary Examiner* — Edward Tso
(74) *Attorney, Agent, or Firm* — Lewis Roca Rothgerber Christie LLP

(57) ABSTRACT

An embodiment of the present invention provides a wireless charging apparatus and a method, in which a reception unit can charge even when an inner coil of the reception unit and an inner coil of a transmission unit are not positioned in parallel. An embodiment of the present invention provides a wireless charging apparatus and a method including: a transmission unit that includes a first coil that generates a magnetic field when power is applied; a reception unit that includes a second coil, and that charges a battery using induced current that is induced in the second coil when the magnetic field of the first coil is generated; a position sensing unit that measures position information for the first coil and the second coil; and a conversion unit that converts (Continued)

a direction of the magnetic field according to the position information for the first coil and the second coil.

13 Claims, 8 Drawing Sheets

(51) Int. Cl.
    *H02J 7/02*         (2016.01)
    *H02J 50/80*      (2016.01)
    *H02J 50/90*      (2016.01)
    *H02J 50/10*      (2016.01)
    *H04B 5/00*       (2006.01)
    *H02J 50/40*      (2016.01)
    *G01G 1/00*       (2006.01)
    *G01C 19/00*     (2013.01)

(52) U.S. Cl.
    CPC .............. *H02J 50/80* (2016.02); *H02J 50/90* (2016.02); *H04B 5/0037* (2013.01); *H04B 5/0093* (2013.01); *G01C 19/00* (2013.01)

(58) Field of Classification Search
    CPC .. H04B 5/0025; H04B 5/0037; H04B 5/0075; H04B 7/0093; B60L 53/12
    USPC .................................. 320/107, 108, 114, 115
    See application file for complete search history.

(56) References Cited

U.S. PATENT DOCUMENTS

| | | | |
|---|---|---|---|
| 9,385,561 B2* | 7/2016 | Sayles | H02J 7/00712 |
| 2010/0156347 A1 | 6/2010 | Lee et al. | |
| 2013/0234659 A1 | 9/2013 | Lee et al. | |
| 2014/0145515 A1* | 5/2014 | Jung | H02J 7/025 |
| | | | 307/104 |
| 2014/0184155 A1 | 7/2014 | Cha | |
| 2014/0194099 A1 | 7/2014 | Park et al. | |
| 2014/0333260 A1 | 11/2014 | Sayles | |
| 2015/0357862 A1 | 12/2015 | Saari et al. | |
| 2016/0036245 A1 | 2/2016 | Chang et al. | |
| 2016/0049827 A1 | 2/2016 | Tilvis et al. | |
| 2019/0067994 A1* | 2/2019 | Song | H02J 50/40 |
| 2019/0096413 A1* | 3/2019 | Moriya | G10L 25/90 |

FOREIGN PATENT DOCUMENTS

| | | |
|---|---|---|
| KR | 10-2010-0074595 A | 7/2010 |
| KR | 10-1294581 B1 | 8/2013 |
| KR | 10-1397668 B1 | 5/2014 |
| KR | 10-2014-0089991 A | 7/2014 |
| KR | 10-2016-0016551 A | 2/2016 |
| WO | WO 2013/093697 A1 | 6/2013 |

\* cited by examiner

WIRELESS CHARGING APPARATUS USING ELECTROMAGNETIC INDUCTION AND WIRELESS CHARGING METHOD USING ELECTROMAGNETIC INDUCTION

CROSS-REFERENCE TO RELATED APPLICATION(S)

This application is a National Phase Patent Application and claims priority to and the benefit of PCT/KR2017/002965, filed on Mar. 20, 2017, which claims priority to and the benefit of Korean Patent Application No. 10-2016-0062907, filed on May 23, 2016, the entire contents of each of which are incorporated herein by reference.

TECHNICAL FIELD

The present invention relates to a wireless charging apparatus and a method therefor.

BACKGROUND

Mobile devices, such as cellular phones, smartphones, or the like, offer not only a basic communication function but a variety of functions including wireless internet connectivity, an electronic organizer function, multimedia shots, a playback function, a game function, digital broadcasting, and so on. For portability, the mobile device is generally equipped with a battery, so that recharging the battery periodically is required. In general, wired charging using a cable has been commonly used in charging a battery. However, with the recent advances in wireless power transfer (WPT) technology, wireless charging apparatuses capable of wirelessly charging a battery are becoming commercialized and distributed.

The WPT can be roughly divided into an electromagnetic inductive method and a resonance method. The electromagnetic inductive method enables power transmission/reception when electrodes are located very close to each other even if there is no direct contact between the electrodes. Therefore, charging can be performed only when a transmission unit of transmitting energy (also generally referred to as a wireless charging pad) and a reception unit of receiving energy (e.g., an electronic device, such as a smartphone) are brought into contact with each other. The resonance method enables charging by supplying power to an electronic device located a predetermined distance away from a power source even if a transmission unit and a reception unit are not in contact with each other.

Meanwhile, the electromagnetic inductive method is problematic in that charging in a reception unit can be performed only when an inner coil of the reception unit and an inner coil of a transmission unit are positioned in parallel.

SUMMARY

An embodiment of the present invention provides a wireless charging apparatus and a method therefor, wherein a reception unit can charge even when an inner coil of the reception unit and an inner coil of a transmission unit are not positioned in parallel.

A wireless charging apparatus using electromagnetic induction in accordance with an embodiment of the present invention comprises a transmission unit including a first coil that generates a magnetic field when power is applied, a reception unit including a second coil and charging a battery using induced current that is induced in the second coil when the magnetic field of the first coil is generated, a position sensing unit measuring position information for the first coil and the second coil, and a conversion unit converting the direction of the magnetic field according to the position information for the first coil and the second coil.

The conversion unit may include at least two pairs of first electromagnets and second electromagnets disposed to face each other between the first coil and the second coil.

The reception unit may include a gyro sensor, and the position sensing unit may measure the position information for the first coil and the second coil based on position information for the gyro sensor.

The position sensing unit may measure the position information for the first coil and the second coil based on information for a maximum efficiency point, at which charging efficiency of the reception unit becomes highest, by sequentially operating at least one of the two electromagnet pairs of the conversion unit, respectively, and then getting feedback on the charging efficiency of the reception unit.

The transmission unit, the position sensing unit and the conversion unit may be installed in a housing in the form of a cup holder.

The transmission unit may include a near field communication (NFC) tag and may open a magnetic field generation path by performing NFC tagging with the reception unit.

The transmission unit may include a mass sensing unit and may open the magnetic field generation path when the mass sensing unit measures a mass of greater than or equal to a preset first mass.

The transmission unit may close the magnetic field generation path when feedback on the charging efficiency of the reception unit is not received or charging is not performed.

The position sensing unit may track the position information for the first coil and the second coil in real time, and the conversion unit may convert the direction of the magnetic field in real time according to the change in the position information for the first coil and the second coil.

A wireless charging method in accordance with an embodiment of the present invention comprises generating a magnetic field through a first coil by applying power to a transmission unit, measuring position information for the first coil and a second coil, and converting the direction of the magnetic field by means of a conversion unit according to the position information for the first coil and the second coil.

In the converting of the direction of the magnetic field, the conversion unit may include at least two pairs of first electromagnets and second electromagnets disposed to face each other between the first coil and the second coil, and may convert the direction of the magnetic field by operating one or more pairs of electromagnets selected according to the position information for the first coil and the second coil.

In the measuring of the position information for the first coil and the second coil, the position information for the first coil and the second coil may be measured based on the position information for the gyro sensor of the reception unit.

In the measuring of the position information for the first coil and the second coil, the position information for the first coil and the second coil may be measured based on information for a maximum charging efficiency point, at which charging efficiency of the reception unit becomes highest, by sequentially operating at least one electromagnet pair among the electromagnet pairs of the conversion unit, respectively, and then getting feedback on the charging efficiency of the reception unit.

In the wireless charging apparatus and method according to the present invention, charging in a reception unit can be performed even if an inner coil of the reception unit and an inner coil of a transmission unit are not positioned in parallel.

DETAILED DESCRIPTION

Hereinafter, some exemplary embodiments of the present invention will be described in further detail with reference to the accompanying drawings, so that those skilled in the art can easily practice the present invention.

As used herein, the term "and/or" includes any and all combinations of one or more of the associated listed items. In addition, the terminology used herein is for the purpose of describing particular embodiments only and is not intended to be limiting of the disclosure. In addition, as used herein, the singular forms are intended to include the plural forms as well, unless the context clearly indicates otherwise. It will be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. These terms are only used to distinguish one member, element, region, layer and/or section from another.

Figure 1:
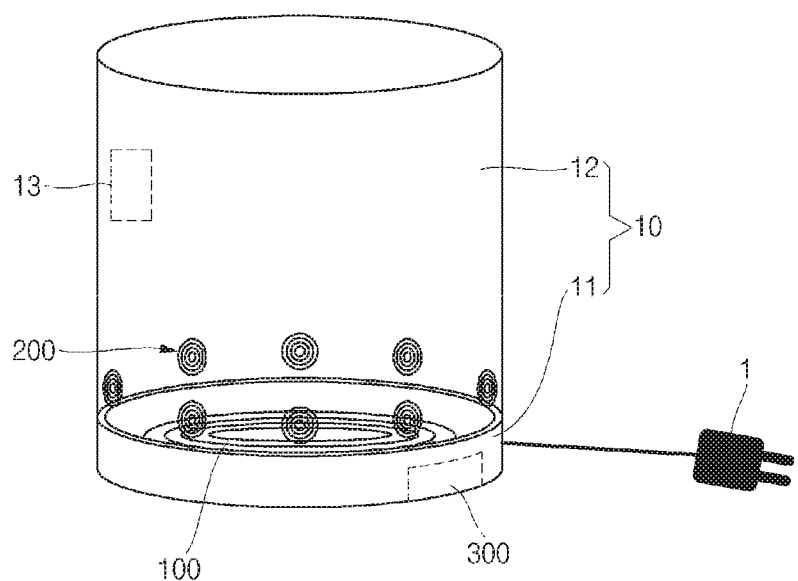
FIG. 1 is a perspective view schematically illustrating a wireless charging apparatus according to an embodiment of the present invention.
Figure 2:
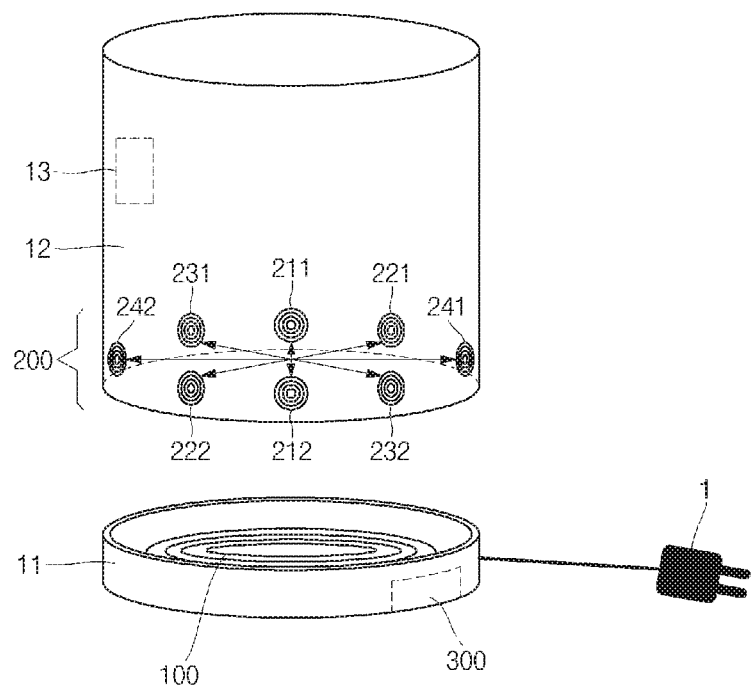
FIG. 2 is an exploded perspective view schematically illustrating the wireless charging apparatus of FIG. 1.
Figure 3:
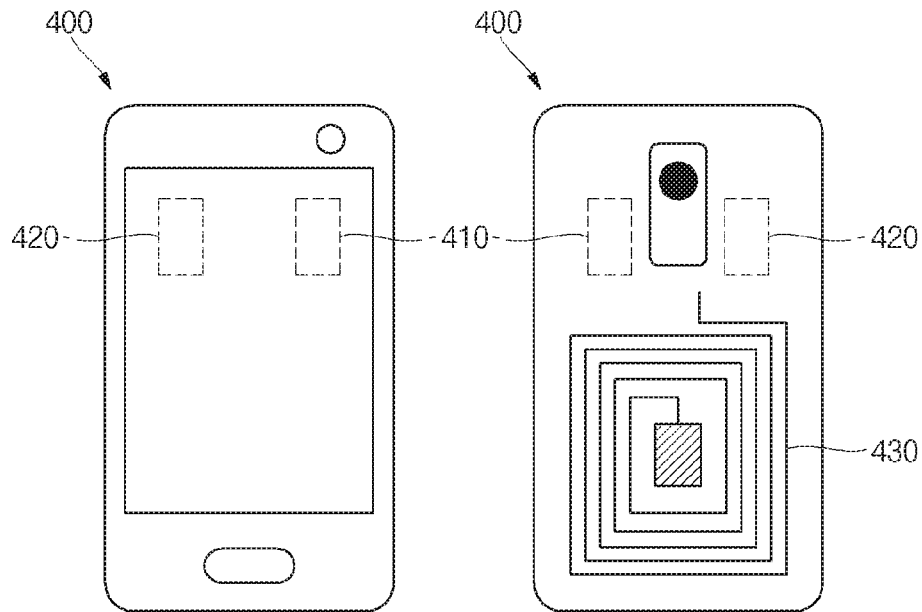
FIG. 3 is a plan view schematically illustrating a reception unit of the wireless charging apparatus according to an embodiment of the present invention.

FIG. 1 is a perspective view schematically illustrating a wireless charging apparatus according to an embodiment of the present invention. FIG. 2 is an exploded perspective view schematically illustrating the wireless charging apparatus of FIG. 1. FIG. 3 is a plan view schematically illustrating a reception unit of the wireless charging apparatus according to an embodiment of the present invention.

Referring to FIGS. 1 to 3, the wireless charging apparatus according to an embodiment of the present invention includes a power supply unit 1, a housing 10, a transmission unit 100, a conversion unit 200, a position sensing unit 300 and a reception unit 400.

The power supply unit 1 supplies electric energy to the wireless charging apparatus according to an embodiment of the present invention from external power (e.g., a commercial AC power) to perform wireless charging between the transmission unit 100 and the reception unit 400. Here, the power supplied by the power supply unit 1 is connected to a switch (not shown) to be opened or closed according to preset conditions.

The housing 10 includes a bottom portion 11 and a sidewall portion 12 upwardly extending from the bottom portion 11. For arrangement of the conversion unit 200, which will later be described, the bottom portion 11 is preferably formed in a disk shape and the sidewall portion 12 is preferably formed in a substantially cylindrical shape. That is to say, the housing 10 is formed in a type of cup holder to then be applied to a vehicle or furniture equipped with a cup holder.

The transmission unit 100 is preferably formed inside the bottom portion 11 and converts the power supplied from the power supply unit 1 into a wireless power signal to then transmit the converted wireless power signal to the reception unit 400. The wireless power signal transmitted by the transmission unit 100 may be formed in the form of a magnetic field or an electromagnetic field having an oscillating property. To this end, the transmission unit 100 may include a first coil that generates the wireless power signal. Here, the first coil of the transmission unit 100 is magnetically coupled to a second coil of the reception unit 400, and an induced electromotive force is generated between the first coil and the second coil. Here, a near field communication (NFC) tag 13 is disposed in the bottom portion 11 or the sidewall portion 12 of the housing 10 and performs NFC tagging with an NFC chip of the reception unit 400, which will later be described, thereby opening a magnetic field generation path in the transmission unit 100.

The conversion unit 200 includes electromagnet pairs consisting of a plurality of first electromagnets 211, 221, 231 and 241 and second electromagnets 212, 222, 232 and 242 disposed to face each other around the sidewall portion 12. While the conversion unit 200 including four pairs of electromagnets 211, 212, 221, 222, 231, 232, 241 and 242 is illustrated, which is, however, for the convenient sake of explanation, the present invention does not limit the number of the pairs of electromagnets 211, 212, 221, 222, 231, 232, 241 and 242 to that illustrated.

Here, the at least one electromagnet pair selected among the pairs of electromagnets 211, 212, 221, 222, 231, 232, 241 and 242 of the conversion unit 200 may be selectively activated according to the position information (e.g., the degree of parallelization, the direction of rotation, etc.) measured by the position sensing unit 300 between the first coil of the transmission unit 100 and the second coil of the reception unit 400, which will later be described.

Each of the at least one electromagnet pair of electromagnets 211, 212, 221, 222, 231, 232, 241 and 242 of the conversion unit 200 generates an auxiliary magnetic field to convert the direction of the magnetic field between the first coil of the transmission unit 100 and the second coil of the reception unit 400 to a desired direction.

The position sensing unit 300 may wirelessly transmit/receive information to/from the reception unit 400. That is to say, the position sensing unit 300 measures position information (e.g., the degree of parallelization, the direction of rotation, etc.) between the first coil of the transmission unit 100 and the second coil of the reception unit 400 based on at least one piece of individual information transmitted from the reception unit 400.

The reception unit 400 may be a mobile device, such as a cellular phone, a smartphone, etc. using a battery incorporated in the mobile device as a power source, and may include a near field communication (NFC) chip 410, a gyro sensor 420, a second coil 430 and a battery (not shown).

The NFC chip 410 performs NFC tagging when it comes into contact with the NFC tag 13 to synchronize the transmission unit 100 with the reception unit 400 to allow the transmission unit 100 and the reception unit 400 to transmit/receive information to/from each other.

The gyro sensor 420 is a sensor that measures an angular velocity. The gyro sensor 420 measures a rotational angle and digitizes values of angles of the reception unit 400 rotating per unit time on the basis of one among X-, Y- and Z-axis.

The second coil 430 is magnetically coupled to the first coil of the reception unit 100 and is electrically connected to the battery (not shown). That is to say, the induced current that is induced to the second coil 430 using electromagnetic induction, as stated above, charges the battery. Here, a circuit unit (not shown) is formed between the second coil 430 and the battery to convert the induced current to the power required for the battery.

Next, a wireless charging method using a wireless charging apparatus according to an embodiment of the present invention will be described with reference to FIGS. 4 to 6.

Figure 4:
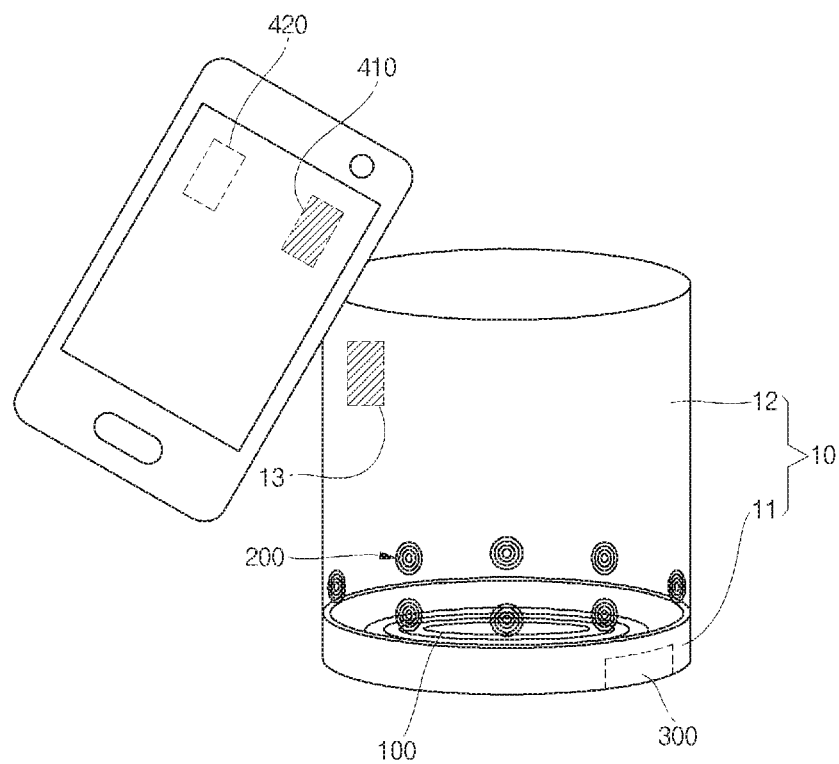
FIGS. 4 to 6 sequentially illustrate a wireless charging method using the wireless charging apparatus according to an embodiment of the present invention.
Figure 5:
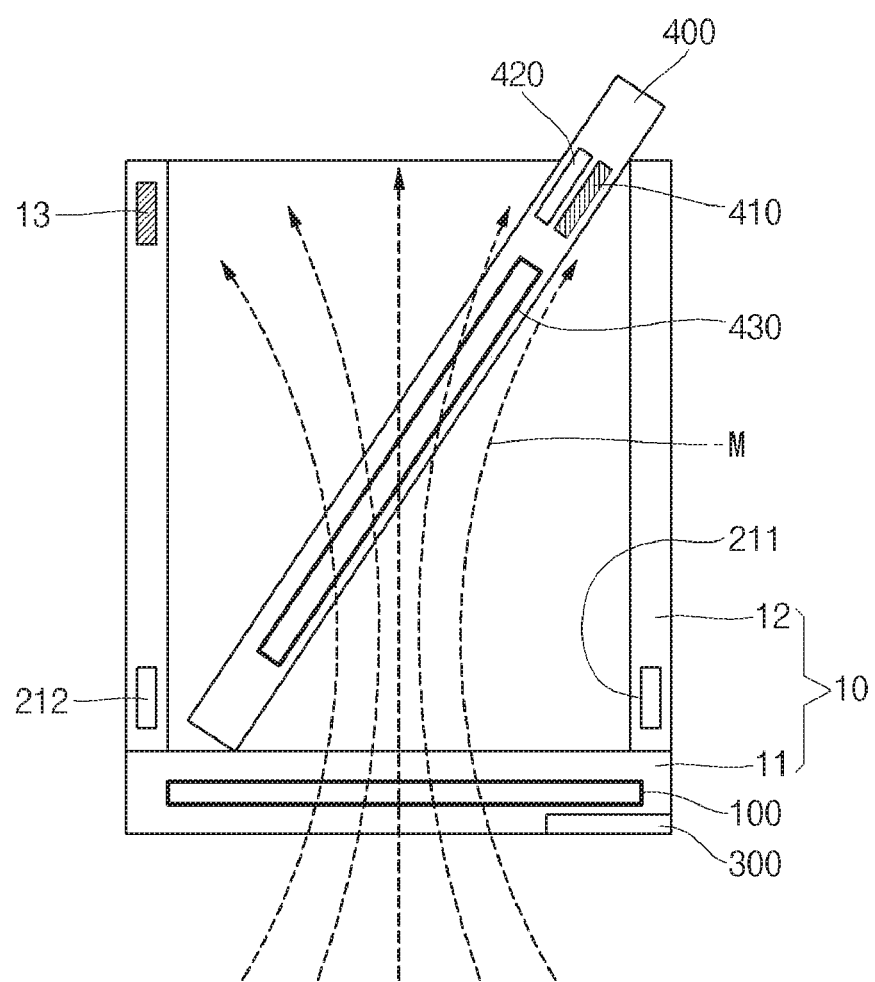
Figure 6:
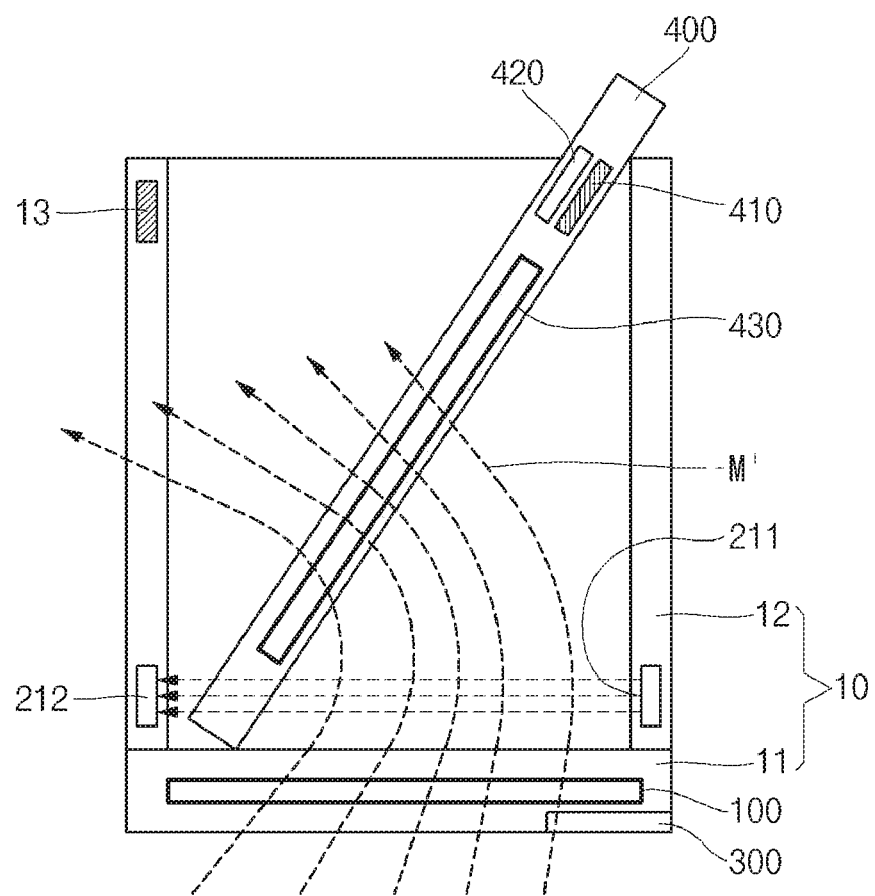

FIGS. 4 to 6 sequentially illustrate a wireless charging method using the wireless charging apparatus according to an embodiment of the present invention.

Referring first to FIG. 4, when the reception unit 400 is positioned to be adjacent to the housing 10 having the transmission unit 100 installed therein, NFC tagging is performed between the NFC chip 410 of the reception unit 400 and the NFC tag 13, the transmission unit 100 and the reception unit 400 are synchronized for transmission/reception of information, and the power supplied to the transmission unit 100 is opened.

Next, referring to FIG. 5, the power is applied to the transmission unit 100, and a magnetic field M is generated from the first coil of the transmission unit 100 to an upper portion of the housing 10.

Here, the position sensing unit 300 receives position information for the reception unit 400, which is digitized by the gyro sensor 420 of the reception unit 400, compares the received position information with position information, which is digitized by a gyro sensor (not shown) installed at the bottom portion 11 of the housing 10, and recognizes the position information for the reception unit 400 using a difference between the received position information and the position information digitized in the gyro sensor of the housing 10.

Next, referring to FIG. 6, after the position information for the reception unit 400 is measured, one or more pairs of electromagnets 211 and 212 are selected among the electromagnets 211, 212, 221, 222, 231, 232, 241 and 242 of the conversion unit 200, at which charging efficiency of the reception unit 400 is to be highest, based on the measured position information, and then operated. Therefore, the direction of the magnetic field M' is converted and electromagnetic induction from the transmission unit 100 to the reception unit 400 is generated, thereby charging the battery of the reception unit 400.

In FIGS. 5 and 6, the position sensing unit 300 tracks the position information measured by the gyro sensor 420 in real time to then selectively operate electromagnets corresponding to the measured position information among the electromagnets 211, 212, 221, 222, 231, 232, 241 and 242 of the conversion unit 200, thereby charging the battery of the reception unit 400 with maximum efficiency.

In addition, in FIGS. 5 and 6, the position sensing unit 300 may also track a maximum efficiency point, at which the charging efficiency of the reception unit 400 becomes highest, while sequentially operating directly one or more pairs of electromagnets among the electromagnets 211, 212, 221, 222, 231, 232, 241 and 242 of the conversion unit 200 without using the gyro sensor 420. Thereafter, the position sensing unit 300 selectively operates the pair of electromagnets 211 and 212 corresponding to the maximum efficiency point to thus convert the direction of the magnetic field M' to generate electromagnetic induction from the transmission unit 100 to the reception unit 400, thereby charging the battery of the reception unit 400.

In FIGS. 5 and 6, the position sensing unit 300 tracks the maximum efficiency point, at which the charging efficiency of the reception unit 400 becomes highest, by sequentially operating one or more pairs of electromagnets selected among the electromagnets 211, 212, 221, 222, 231, 232, 241 and 242 of the conversion unit 200, respectively, for every preset period, and selectively operates the pairs of electromagnets corresponding to the maximum charging efficiency point, thereby charging the battery of the reception unit 400 with maximum efficiency.

Next, a wireless charging method using a wireless charging apparatus according to an embodiment of the present invention will be described with reference to FIGS. 7 to 10.

FIGS. 7 to 10 sequentially illustrate a wireless charging method using a wireless charging apparatus according to another embodiment of the present invention.

Figure 7:
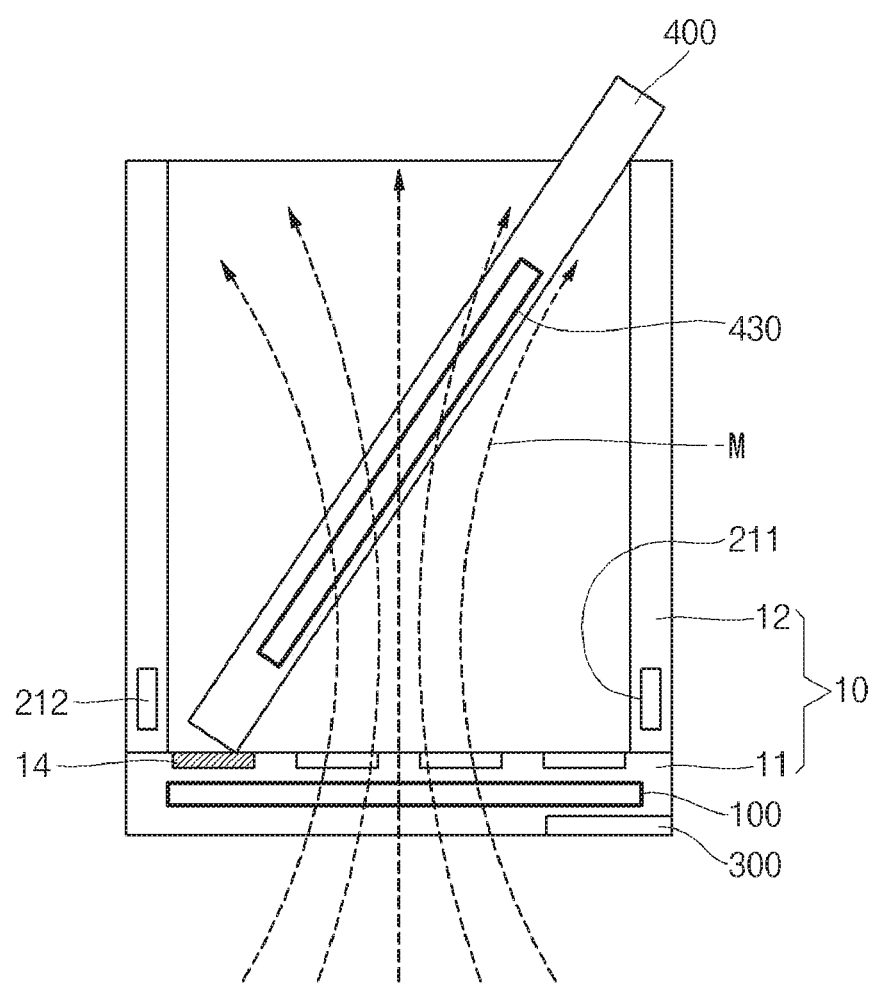
FIGS. 7 to 10 sequentially illustrate a wireless charging method using a wireless charging apparatus according to another embodiment of the present invention.

Comparatively referring to FIGS. 5 and 7, the wireless charging apparatus according to another embodiment of the present invention is different from the wireless charging apparatus according to an embodiment of the present invention in view of the configuration of a mass sensing unit 14. Therefore, the following description of the wireless charging apparatus according to another embodiment of the present invention and a method therefor will focus on the mass sensing unit 14. In addition, in describing the wireless charging apparatus according to another embodiment of the present invention and the method therefor, functional components which are the same as or similar to those of the wireless charging apparatus illustrated in FIG. 4 and the method therefor are denoted by the same reference numerals, and detailed descriptions thereof will not be given.

Referring to FIGS. 7 to 10, the mass sensing unit 14 may be formed as a single unit corresponding to a bottom portion 11 of a housing 10 as a whole or may be formed as a multitude of separated units. The mass sensing unit 14 senses whether a mass 2, 400 inserted into the housing 10 has a mass of greater than or equal to a preset first mass to synchronize a transmission unit 100 with the mass 2, 400 for transmitting/receiving information to/from each other. In addition, the mass sensing unit 14 opens the power supplied to the transmission unit 100 to wirelessly charge the mass 2, 400. However, when synchronization between the transmission unit 100 and the mass 2, 400 cannot be achieved and the charging efficiency of the mass 2, 400 is not detectable, it is determined that the mass 2, 400 is an object that cannot be charged. Accordingly, the power supplied to the transmission unit 100 is cut off and the wireless charging procedure is terminated.

Referring first to FIG. 7, the mass sensing unit 14 senses that the mass 400 (i.e., a reception unit) is inserted into the housing 10. Then, power is supplied to the transmission unit 100 according to a mass sensing signal detected from the mass sensing unit 14 to then generate a magnetic field M, and synchronization between the transmission unit 100 and the mass 400 is attempted.

If the synchronization is successful, the mass 400 is determined as the reception unit 400. Then, a position sensing unit 300 receives position information for the reception unit 400, which is digitized by a gyro sensor 420 of the reception unit 400, compares the digitized position information with the position information digitized in a gyro sensor (not shown) installed at the bottom portion 11 of the housing 10, and recognizes the position information for the reception unit 400 using a difference between the position information received from the gyro sensor 420 and the position information digitized in the gyro sensor of the housing 10.

Figure 8:
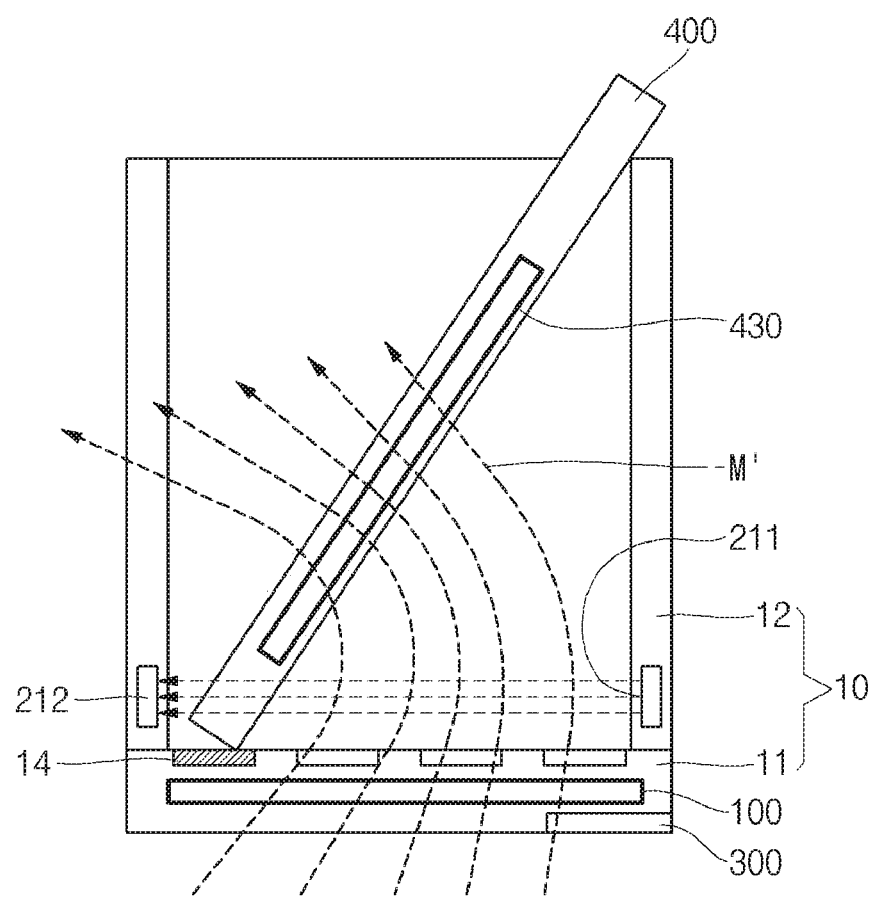

Next, referring to FIG. 8, after the position information for the reception unit 400 is measured, one or more pairs of electromagnets 211 and 212 are selected among electromagnets 211, 212, 221, 222, 231, 232, 241 and 242 of a conversion unit 200, at which charging efficiency of the reception unit 400 is to be highest, based on the measured position information, and then operated. Therefore, the direction of the magnetic field M' is converted and electromagnetic induction from the transmission unit 100 to the reception unit 400 is generated, thereby charging the battery of the reception unit 400.

In FIGS. 7 and 8, the position sensing unit 300 tracks position information measured by the gyro sensor 420 in real time to then selectively operate electromagnets corresponding to the measured position information among the electromagnets 211, 212, 221, 222, 231, 232, 241 and 242 of the conversion unit 200, thereby charging the battery of the reception unit 400 with maximum efficiency.

In addition, in FIGS. 7 and 8, the position sensing unit 300 tracks a maximum efficiency point, at which the charging efficiency of the reception unit 400 becomes highest, while sequentially operating directly one or more pairs of electromagnets among the electromagnets 211, 212, 221, 222, 231, 232, 241 and 242 of the conversion unit 200 without using the gyro sensor 420. Thereafter, the pair of electromagnets 211 and 212 corresponding to the maximum efficiency point are selected and then operated. Therefore, the direction of the magnetic field M' is converted and electromagnetic induction from the transmission unit 100 to the reception unit 400 is generated, thereby charging the battery of the reception unit 400.

In FIGS. 7 and 8, the position sensing unit 300 tracks the maximum efficiency point, at which the charging efficiency of the reception unit 400 becomes highest, by sequentially operating one or more pairs of electromagnets selected among the electromagnets 211, 212, 221, 222, 231, 232, 241 and 242 of the conversion unit 200, respectively, for every preset period, and selectively operates the pairs of electromagnets corresponding to the maximum efficiency point, thereby charging the battery of the reception unit 400 with maximum efficiency.

Figure 9:
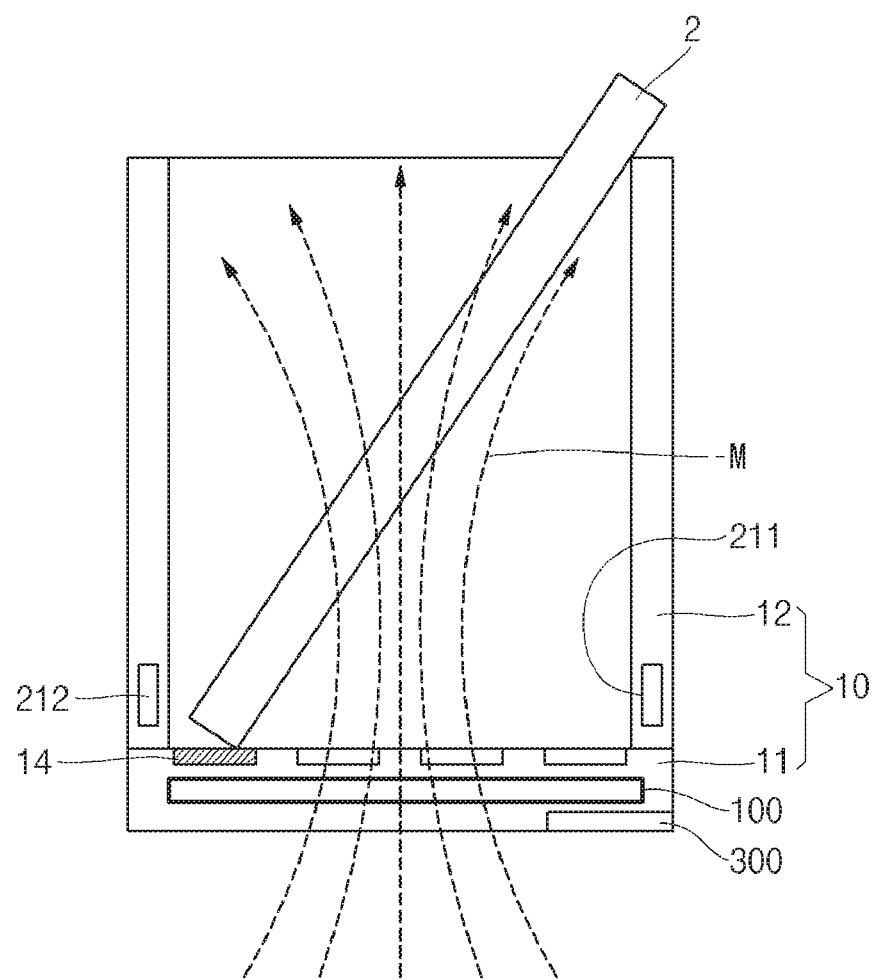

Referring to FIG. 9, the mass sensing unit 14 detects that the mass 2 is inserted into the housing 10. Then, power is supplied to the transmission unit 100 according to a mass sensing signal detected from the mass sensing unit 14 to thus generate a magnetic field M, and synchronization between the transmission unit 100 and the mass 2 is attempted.

Figure 10:
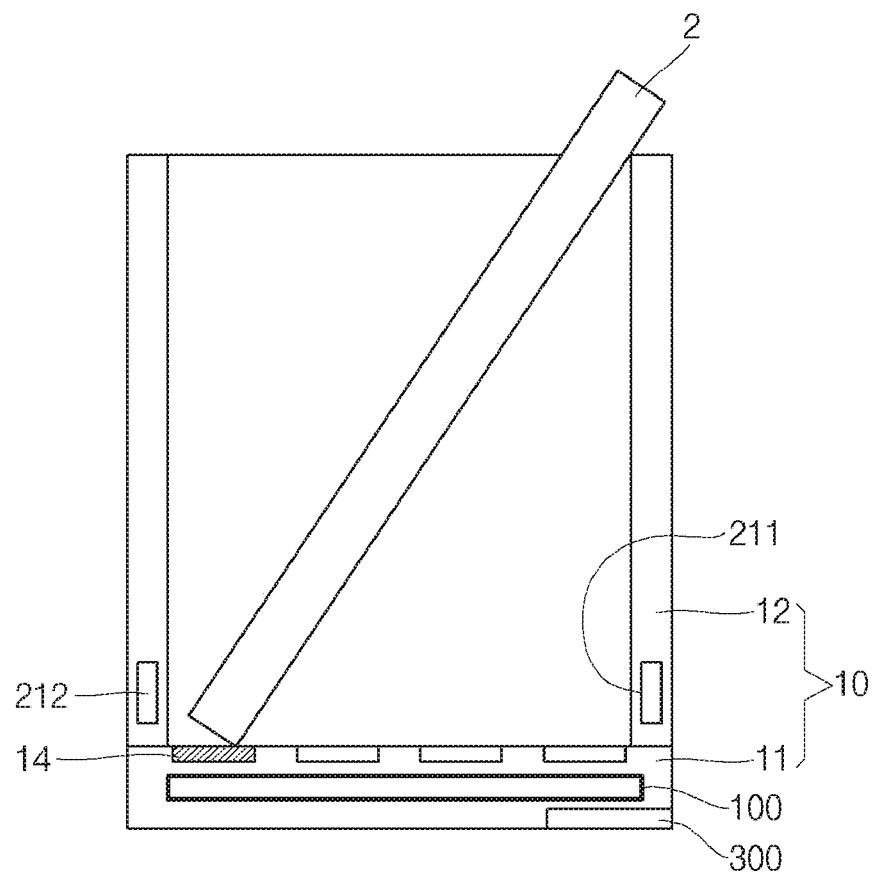

However, if the synchronization between the transmission unit 100 and the mass 2 is not successfully performed, as illustrated in FIG. 10, the mass 2 detected by the mass sensing unit 14 is determined to be an object that cannot be charged. Accordingly, the power supplied to the transmission unit 100 is cut off and the wireless charging procedure is terminated.

Although the foregoing embodiments have been described to practice the wireless charging apparatus according to the present invention and the method therefor, these embodiments are set forth for illustrative purposes and do not serve to limit the invention. Those skilled in the art will readily appreciate that many modifications and variations can be made without departing from the spirit and scope of the present invention.

The present invention relates to a wireless charging apparatus and a method therefor.

The invention claimed is:

1. A wireless charging apparatus using electromagnetic induction, the wireless charging apparatus comprising:
   a transmission unit including a first coil that generates a magnetic field when power is applied;
   a reception unit including a second coil and charging a battery using induced current that is induced in the second coil when the magnetic field of the first coil is generated;
   a position sensing unit measuring position information for the first coil and the second coil; and
   a conversion unit converting a direction of the magnetic field according to the position information for the first coil and the second coil.

2. The wireless charging apparatus of claim 1, wherein the conversion unit includes at least two pairs of first electromagnets and second electromagnets disposed to face each other between the first coil and the second coil.

3. The wireless charging apparatus of claim 2, wherein the reception unit includes a gyro sensor, and the position sensing unit measures the position information for the first coil and the second coil based on position information for the gyro sensor.

4. The wireless charging apparatus of claim 3, wherein the position sensing unit measures the position information for the first coil and the second coil based on information for a maximum efficiency point, at which charging efficiency of the reception unit becomes highest, by sequentially operating at least one of the at least two electromagnet pairs of the conversion unit, respectively, and then getting feedback on the charging efficiency of the reception unit.

5. The wireless charging apparatus of claim 2, wherein the transmission unit, the position sensing unit and the conversion unit are installed in a housing in the form of a cup holder.

6. The wireless charging apparatus of claim 1, wherein the transmission unit includes a near field communication (NFC) tag and opens a magnetic field generation path by performing NFC tagging with the reception unit.

7. The wireless charging apparatus of claim 1, wherein the transmission unit includes a mass sensing unit and opens the magnetic field generation path when the mass sensing unit measures a mass of greater than or equal to a preset first mass.

8. The wireless charging apparatus of claim 7, wherein the transmission unit closes the magnetic field generation path when feedback on the charging efficiency of the reception unit is not received or charging is not performed.

9. The wireless charging apparatus of claim 1, wherein the position sensing unit tracks the position information for the first coil and the second coil in real time, and the conversion unit converts the direction of the magnetic field in real time according to a change in the position information for the first coil and the second coil.

10. A wireless charging method using electromagnetic induction between a first coil included in a transmission unit and a second coil included in a reception unit, the wireless charging method comprising:
   generating a magnetic field through the first coil by applying power to the transmission unit;

measuring position information for the first coil and the second coil; and converting a direction of the magnetic field by means of a conversion unit according to the position information for the first coil and the second coil.

11. The wireless charging method of claim 10, wherein in the converting of the direction of the magnetic field, the conversion unit includes at least two pairs of first electromagnets and second electromagnets disposed to face each other between the first coil and the second coil, and converts the direction of the magnetic field by operating one or more pairs of electromagnets of the at least two pairs of first electromagnets and second electromagnets selected according to the position information for the first coil and the second coil.

12. The wireless charging method of claim 11, wherein in the measuring of the position information for the first coil and the second coil, the position information for the first coil and the second coil is measured based on the position information for a gyro sensor of the reception unit.

13. The wireless charging method of claim 11, wherein in the measuring of the position information for the first coil and the second coil, the position information for the first coil and the second coil is measured based on information for a maximum charging efficiency point, at which charging efficiency of the reception unit becomes highest, by sequentially operating at least one electromagnet pair among the electromagnet pairs of the conversion unit, respectively, and then getting feedback on the charging efficiency of the reception unit.

* * * * *